United States Patent
Williams

(10) Patent No.: US 8,973,937 B2
(45) Date of Patent: Mar. 10, 2015

(54) SHOCK ABSORBER WITH COMPLIANT MEMBERS

(76) Inventor: David Delon Williams, Bountiful, UT (US)

( * ) Notice: Subject to any disclaimer, the term of this patent is extended or adjusted under 35 U.S.C. 154(b) by 0 days.

(21) Appl. No.: 13/316,684

(22) Filed: Dec. 12, 2011

(65) Prior Publication Data

US 2012/0146311 A1    Jun. 14, 2012

Related U.S. Application Data

(60) Provisional application No. 61/459,374, filed on Dec. 13, 2010.

(51) Int. Cl.
   B62K 25/04    (2006.01)
   B62K 21/02    (2006.01)
   F16F 1/18     (2006.01)
   F16F 3/02     (2006.01)

(52) U.S. Cl.
   CPC ............... B62K 21/02 (2013.01); B62K 25/04 (2013.01); F16F 1/18 (2013.01); F16F 3/023 (2013.01); B62K 2025/041 (2013.01)
   USPC ........................................... 280/276

(58) Field of Classification Search
   USPC ............................. 280/276, 275, 277; 623/55
   See application file for complete search history.

(56) References Cited

U.S. PATENT DOCUMENTS

| | | | |
|---|---|---|---|
| 224,937 A * | 2/1880 | Mintzer | 36/7.8 |
| 252,326 A | 10/1881 | Pennoyer | |
| 498,800 A * | 6/1893 | Kromer | 280/254 |
| 876,021 A * | 1/1908 | Schenck | 280/276 |
| 1,290,864 A | 3/1918 | Andre | |
| 2,335,907 A | 12/1941 | Boor | |
| 3,497,198 A | 2/1970 | Miller | |
| 3,752,270 A | 8/1973 | Valdespino | |
| 4,372,545 A | 2/1983 | Federspiel | |
| 4,972,920 A * | 11/1990 | Zamitter et al. | 180/227 |
| 4,994,086 A * | 2/1991 | Edwards | 623/26 |
| 5,094,324 A | 3/1992 | Tsai | |
| 5,181,732 A | 1/1993 | Bezin et al. | |
| 5,458,656 A * | 10/1995 | Phillips | 623/27 |
| 5,653,767 A * | 8/1997 | Allen et al. | 623/52 |
| 5,653,768 A * | 8/1997 | Kania | 623/55 |
| 5,682,966 A | 11/1997 | Cabrerizo-Pariente | |
| 5,713,819 A * | 2/1998 | Hsieh | 482/77 |
| 5,899,944 A * | 5/1999 | Phillips | 623/55 |
| 6,454,055 B1 | 9/2002 | Coons | |
| 6,558,297 B1 * | 5/2003 | Brown et al. | 482/77 |
| 7,063,343 B1 | 6/2006 | Chen | |
| 7,172,630 B2 * | 2/2007 | Christensen | 623/53 |
| 7,464,950 B2 | 12/2008 | Schuman et al. | |
| 8,034,121 B2 * | 10/2011 | Christensen | 623/55 |
| 2005/0049721 A1 * | 3/2005 | Sulprizio | 623/52 |

* cited by examiner

Primary Examiner — Tony Winner

(57) ABSTRACT

The present invention provides a shock absorber with compliant members. Shock absorption is provided by the bending and rebound of curved, flexible arms. The deflection and the damping capabilities of the shock absorber are determined by the dimensions, curvature, and material modulus of elasticity of these compliant members. The shock absorber with compliant members technology may be applied to a bicycle front fork shock absorber and a rear shock absorber, both described herein. The benefits of a shock absorber with compliant members are that it is light-weight, it is simple in design, it has few movable joints, it can be designed to have precise flexion and damping characteristics, and it is resilient in harsh conditions.

10 Claims, 19 Drawing Sheets

100

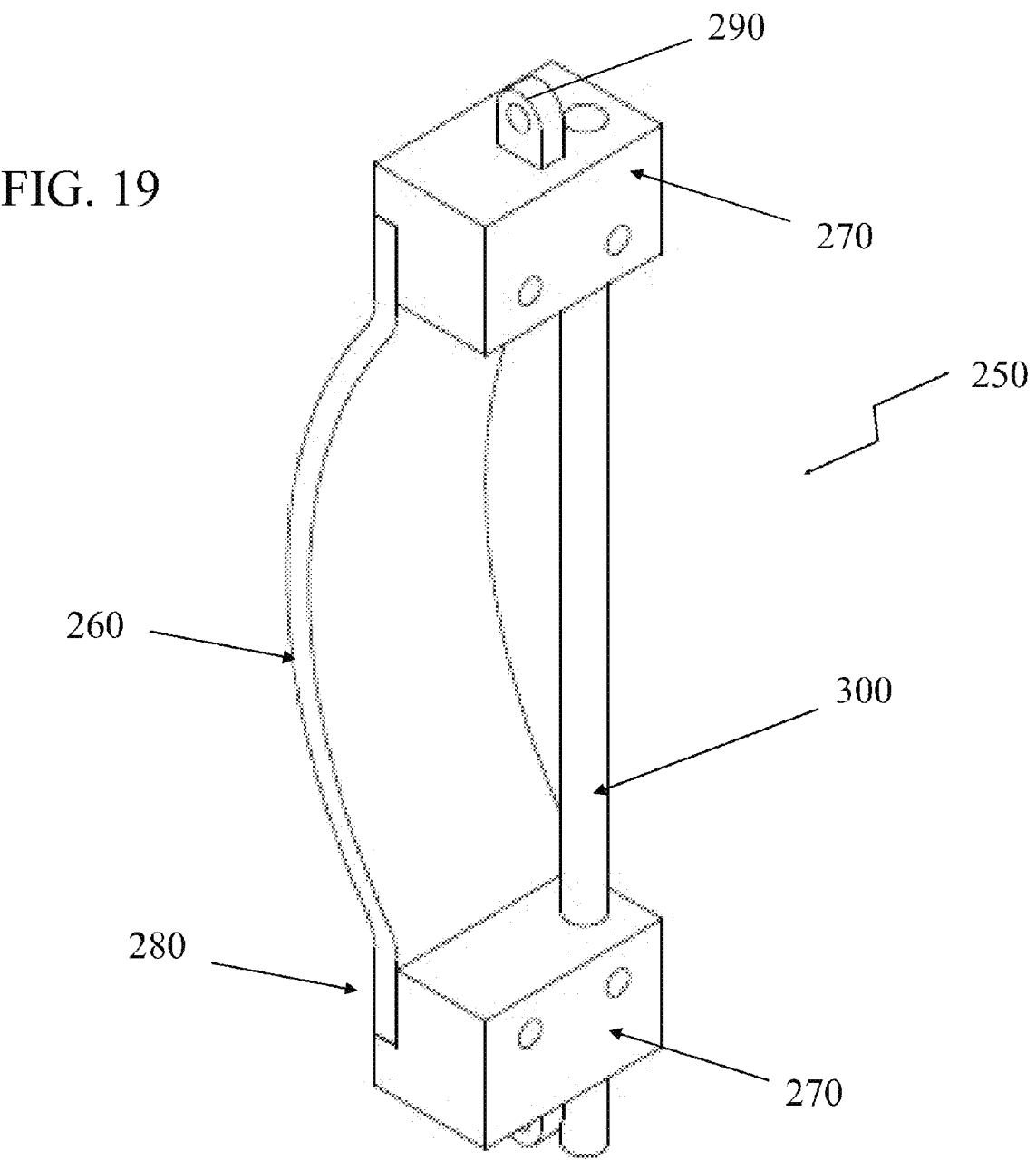

SHOCK ABSORBER WITH COMPLIANT MEMBERS

CROSS-REFERENCE TO RELATED APPLICATIONS

Priority is claimed for the following prior-filed U.S. provisional patent application No. 61/459,374, which was filed Dec. 13, 2010, which is hereby incorporated by reference in its entirety.

BACKGROUND

The present invention relates generally to shock absorbers and refers more particularly to shock absorbers of the compliant type.

Advances in the field of shock absorbers have given rise to a great number of shock absorber solutions of many varieties. Shock absorbers are used where the damping of shock impulse and kinetic energy is required. These shock absorbers are tuned to have specific capacity ratings and damping coefficients. Some applications include machinery, automobiles, motorcycles, and bicycles. Current shock absorbers of the piston type utilize hydraulic, pneumatic, or coil spring technology, or a combination of these to provide damping.

Compliant mechanisms in many forms have been used for centuries, however the study and understanding of compliant mechanisms is a recent development. The bow used for hunting and warfare is an example of a basic compliant mechanism that has existed for centuries. Only recently has mankind been able to quantify the mechanical performance of compliant mechanisms, specifically large-deflection compliant members, and design compliant mechanisms based on this knowledge. Due to these recent developments, it has become possible to design shock absorbers that utilize compliant members.

Specifically for bicycles, shock absorbers that are lightweight, simple, and are not affected by poor environmental conditions are advantageous. Bicycle shock absorbers utilize hydraulic, pneumatic, or coil spring technology, or a combination of these to provide damping. Shock absorption in bicycling is needed for uneven terrain, rocks, and other objects. In order to hold up in such conditions, bicycle shock absorbers are made of metals and other heavy materials, and have a robust design that can endure high-magnitude shock impulses. Due to the materials used and the robust design, bicycle shock absorbers are relatively heavy. Heavy bicycle components are undesirable to bicycle riders because more physical exertion is required to ride a heavy bicycle. Additionally, bicycle shock absorbers are exposed to dirty, muddy, sandy, and wet environmental conditions. Shock absorbers with moving, sliding, rotating, and twisting parts can potentially become functionally impaired from the environmental conditions described above.

It would therefore be advantageous to have a bicycle shock absorber that is lighter weight than existing bicycle shock absorbers. It would be advantageous to have a bicycle shock absorber that is designed with fewer components than the existing shock absorbers. It would be advantageous to have a bicycle shock absorber that is designed in a manner that reduces the potential for functional impairment due to environmental conditions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The embodiments described below and in the claims relate to shock absorbers with compliant members. These devices are generally useful as shock absorbers for bicycles, motorcycles, automobiles, and other machinery where piston-type, pneumatic, hydraulic, or coil-spring-type shock absorbers are otherwise utilized. The benefits of a shock absorber with compliant members are that it is light-weight, it is simple in design, it has few movable joints, it can be designed to have precise flexion and damping characteristics, and it is resilient in harsh conditions.

In some embodiments, a shock absorber is comprised of two compliant members mounted at both ends to mounting blocks. Those compliant members are bow-shaped outward to allow for flexion. Their mechanical function follows the characteristics of an initially curved beam that is pinned at both ends with forces directed inwards towards the ends. Those compliant members are shaped to predefined lengths and curvatures based on the desired amount of flexion and damping for a given mechanical system of specific weight. This shock absorber may then be attached to mechanical system to provide damping.

In some embodiments, the shape and design of a mounting block are based on the requirements of the shock absorber. A basic mounting block has points to which compliant members are attached and a point that connects to the larger system. A mounting block can vary in dimensions, shape, material, and function. It can be comprised of one, two or more pieces.

In some embodiments, a shock absorber is comprised of two or more compliant members. The number of members used affects the stability and the damping performance of the shock absorber. Additional members may be attached over or next to existing members.

In some embodiments, the orientation of the compliant members of the shock absorber can vary. Consider the direction of force loaded on the shock absorber to be vertical. The compliant members could be aligned and oriented parallel to the vertical direction of force. The compliant members could be oriented at an angle offset from the vertical direction of force. The compliant members could be rotated around the vertical axis of force. The direction of the curvature of compliant members can be oriented outward, inward, or in another direction.

In some embodiments, the shape and dimensions of the compliant members varies. A typical shape of a compliant member is curved similar to the bow, with the thickness of the compliant member being less than the length and width so that the compliant member flexes in the direction of the curvature when compressed while resisting flexion in the lateral direction. A typical cross-sectional shape of a compliant member is rectangular. The cross-sectional shape can also be elliptical, triangular, bent-rectangular, and a myriad of other shapes that allow for flexion in a specific direction. The cross-sectional shape can be constant or vary throughout the compliant member, depending on the desired flexural and damping characteristics of the compliant member. The length, width, thickness, and curvature of the compliant member can vary depending on the desired flexural and damping characteristics of the compliant member. The number of curves of a compliant member varies to alter the amount of displacement in the horizontal direction while maintaining similar vertical displacement. In some embodiments, the shape of a compliant member can be modified so that the stresses throughout the member are constant. This will reduce the amount of material used in a compliant member while maintaining similar flexion and damping characteristics.

In some embodiments, a stabilization structure is incorporated into the shock absorber to control the direction of flexion. The stabilization structure can be, but is not limited to, tubular of elliptical or polygonal cross-sectional shape. The stabilization structure can be connected to one mounting block and slides past the other mounting block so that it doesn't restrict the flexion and damping of the shock absorber. It can also be a system of links with pivot points.

In some embodiments, a shock absorber is designed in such a way that it functions as a bicycle front fork shock absorber. The design of the bicycle front fork shock absorber with compliant members varies per the embodiments described above.

In some embodiments, a shock absorber is designed in such a way that it functions as a bicycle rear suspension shock absorber. The design of the bicycle rear suspension shock absorber with compliant members varies per the embodiments described above.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 19 illustrates a perspective view of a single compliant member shock absorber with a stabilization structure.

DETAILED DESCRIPTION

Figure 1:
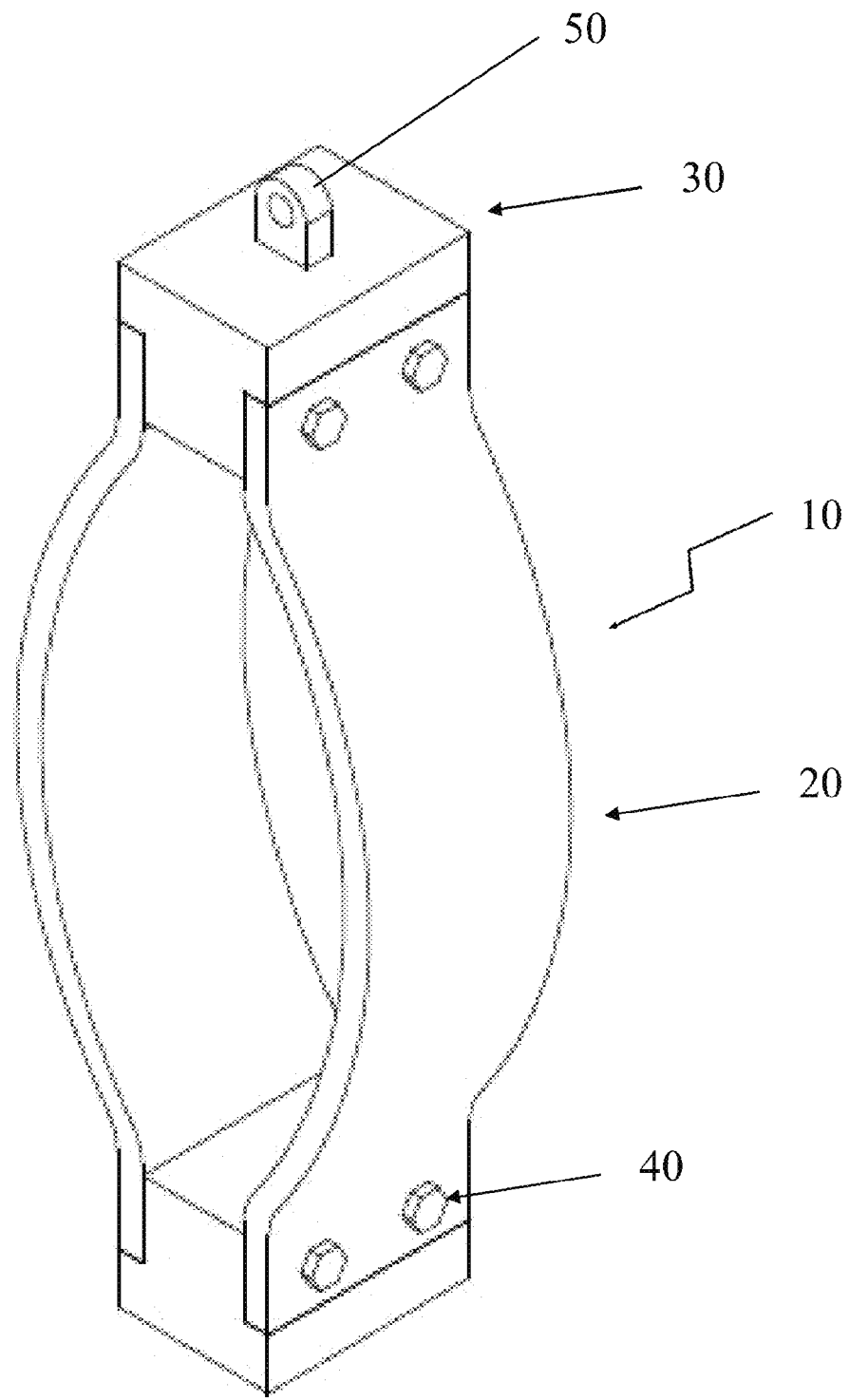
FIG. 1 illustrates a perspective view of a shock absorber of the present invention.

Referring to the drawings in detail, a compliant member 20 of a shock absorber 10 is shown generally in the drawings. The compliant member 20 has the compliant mechanical characteristics of an initially curved beam that is pinned at both ends. Forces applied to the compliant member 20 are directed inwards at the ends. In other words, the forces act inwardly along a line drawn between the two ends of the curved beam. In some embodiments these forces are parallel but not directly aligned between two offset ends, as discussed later in this document. The compliant member 20 may be made of any material that is capable of storing kinetic energy as potential energy when it is flexed and returns to its original shape after being flexed, such as, for example, ABS, acrylic, acetal copolymer, butyrate, carbon fiber, Delrin, Garolite, nylon, PETG, polycarbonate, polyethylene (HDPE), PTFE, PVC, polyethylene terephthalate (PET), polyimide, polypropylene, polystyrene, and Teflon and other materials of similar use known in the art.

Figure 2:
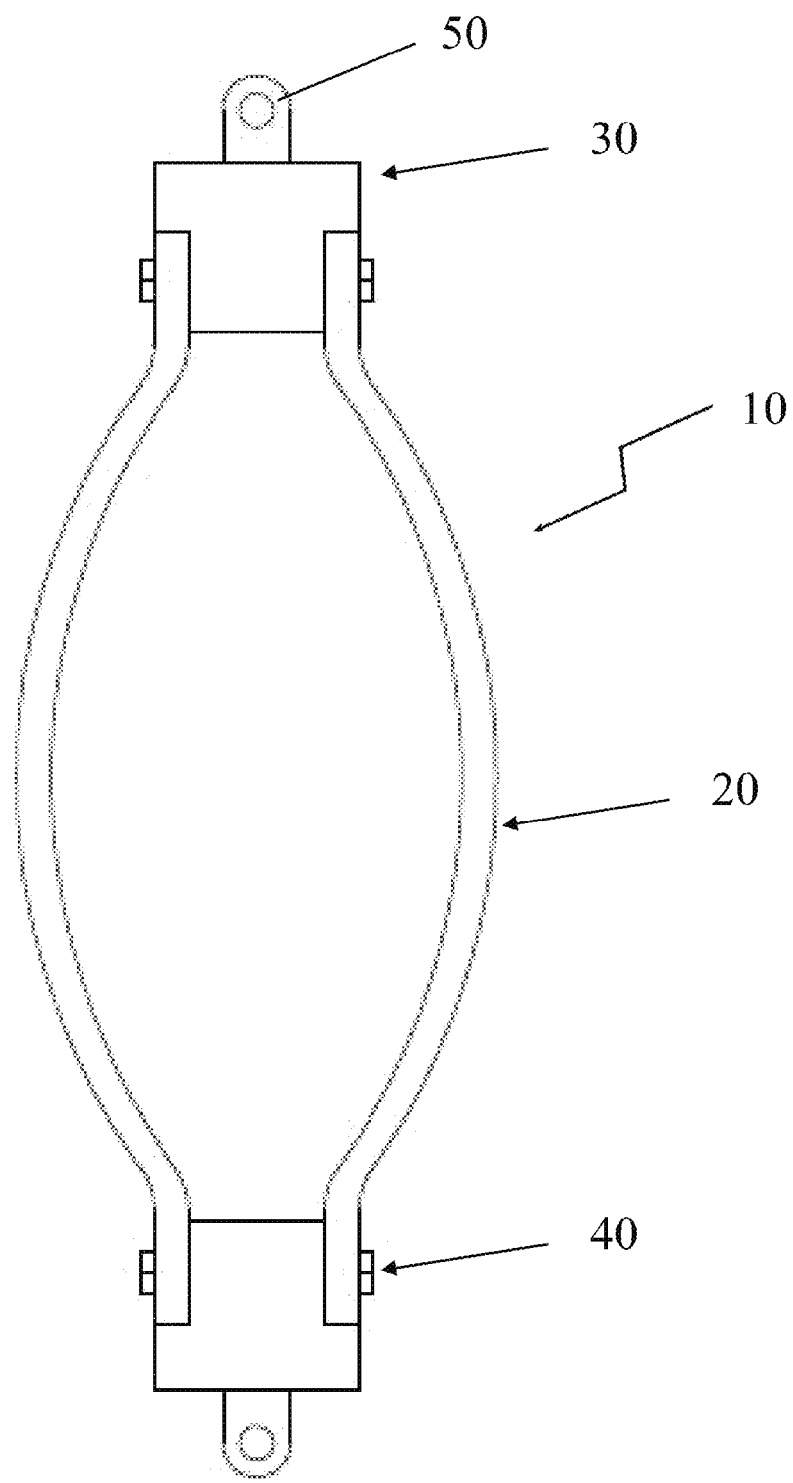
FIG. 2 illustrates a side plan view of a shock absorber of the present invention.

In some embodiments the compliant member 20 is affixed to a mounting block 30 at both of its ends, as shown in FIGS. 1 and 2. In some embodiments it may be preferable to mount the compliant member 20 to the mounting block 30 with screws, bolts, or another mechanical fastening means 40. In these embodiments the compliant member 20 may be mounted by any method that provides a secure connection which keeps the compliant member 20 affixed to the mounting block 30, including but not limited to clamps, welds, adhesive, epoxy, or a rotating pin joint. In some embodiments it may be preferable to do away with a mechanical fastening means 40 to connect the compliant member 20 to a mounting block 30 at one or both ends by combining the compliant member 20 and the mounting block 30 into one solid piece with a mounting block similar to the shape shown in the figures formed at the end of the compliant member 20.

In embodiments having multiple compliant members 20, the mounting block 30 may be used to connect the ends of multiple compliant members 20 together so that the flexure of each compliant member 20 may be distributed throughout the shock absorber 10. This is shown in FIGS. 1 through 6 and 11 through 13, where multiple compliant members are all connected to mounting blocks at their ends.

The mounting block 30 of these embodiments connects the shock absorber 10 to an external mechanical system. In some embodiments the mounting block 30 may be connected to an external mechanical system by methods including but not limited to a bracket 50, bolts, clamps, welds, adhesive, epoxy, or a rotating pin joint. Alternatively the mounting block 30 may be formed as one solid piece with a portion or component of the external mechanical system.

In some embodiments, the mounting block 30 is rectangular in shape with holes to which compliant members 20 are affixed. The mounting block 30 is attached to an external mechanical system by connecting the bracket 50 to a compatible external connector. The mounting block 30 may take various geometries, dimensions, and shapes, including rectangular, circular, elliptical, triangular, polygonal, etc., depending on the design requirements of the system. The mounting block 30 may be made of any material that is strong and rigid, and of materials including but not limited to steel, aluminum, titanium, carbon fiber, fiberglass, Delrin, polypropylene, and other metals, polymers and composites.

Figure 3:
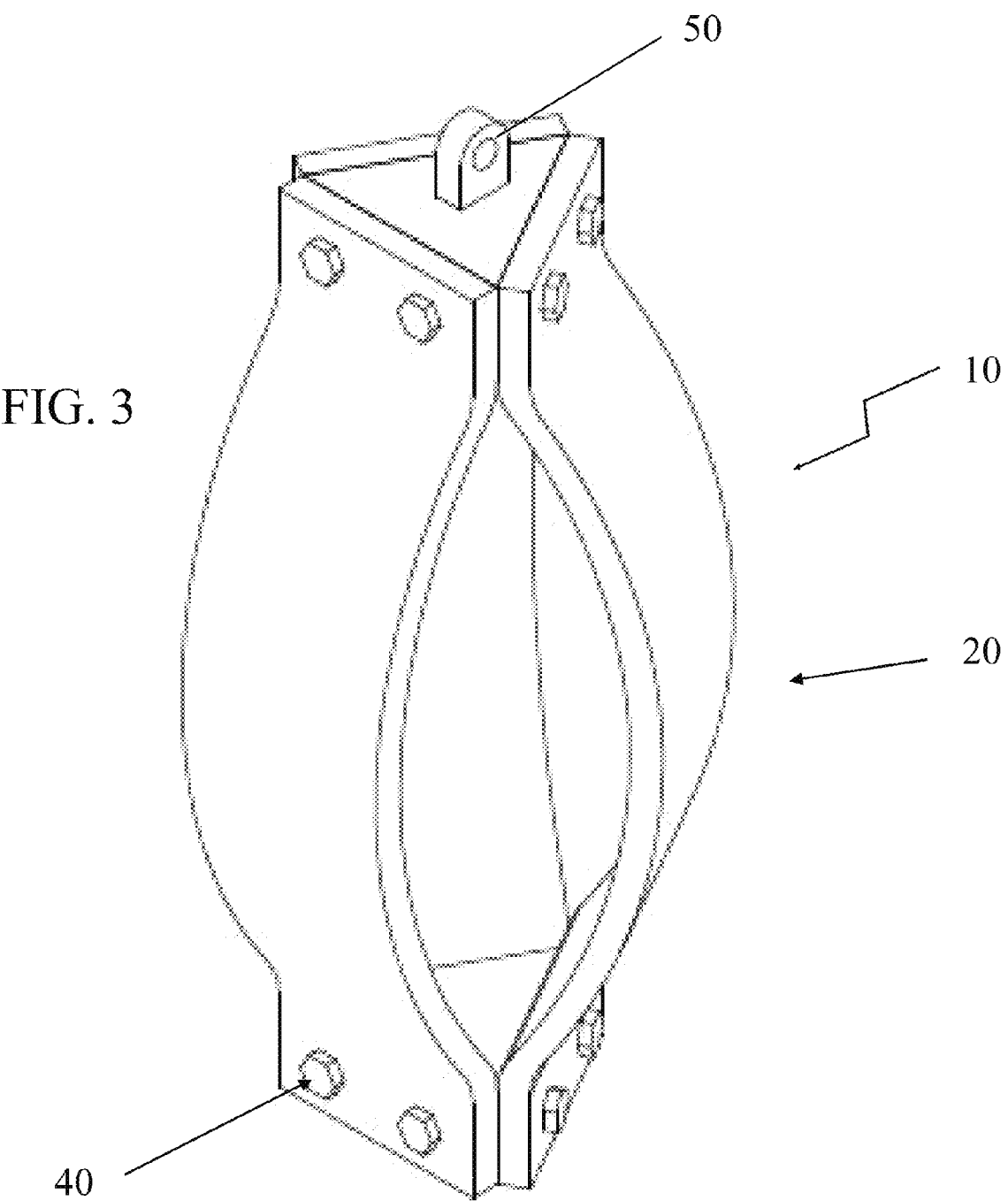
FIG. 3 illustrates a perspective view of a shock absorber of the present invention with three compliant members.
Figure 4:
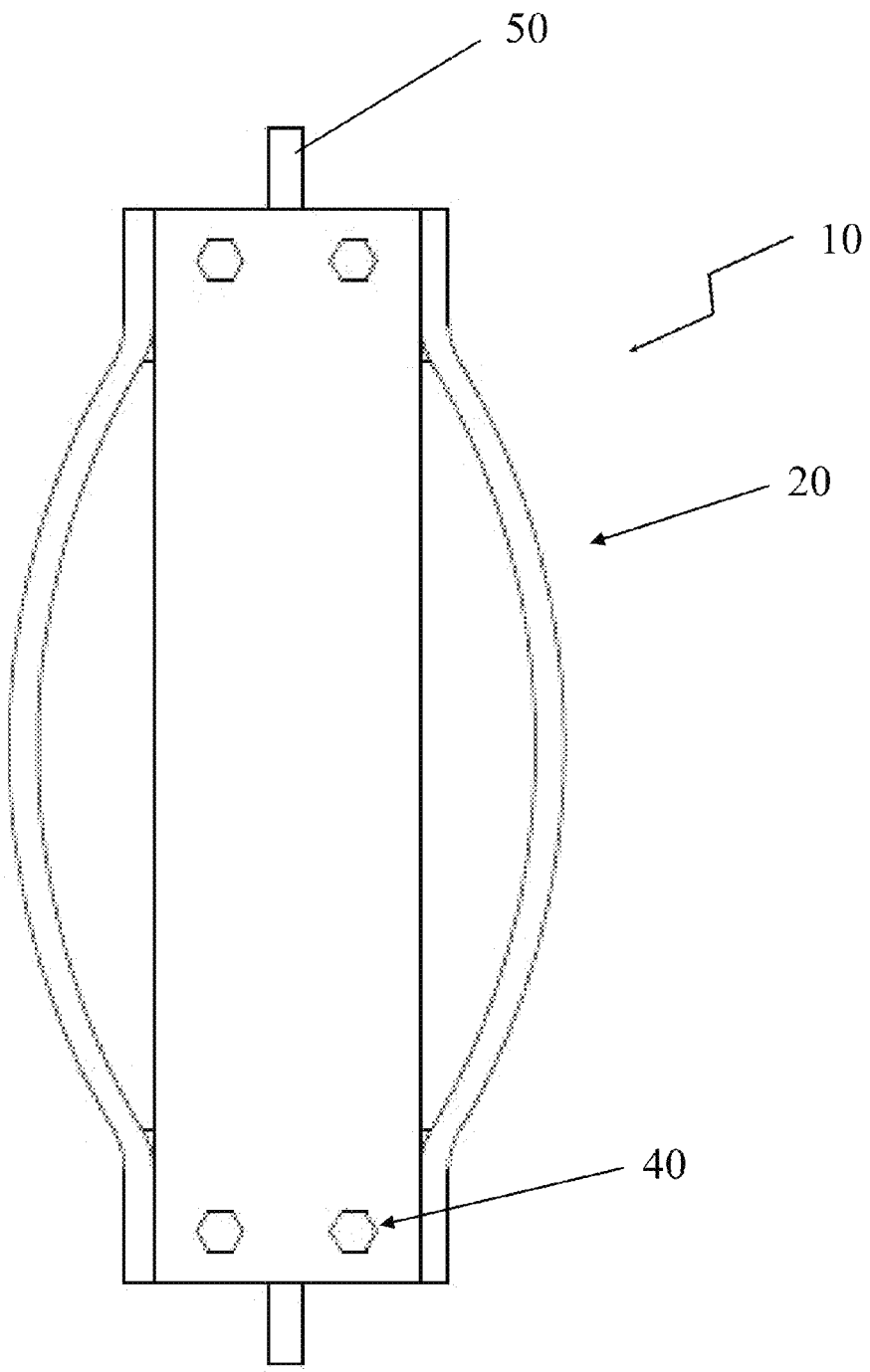
FIG. 4 illustrates a side plan view of a shock absorber of the present invention with three compliant members.

In some embodiments, a shock absorber 10 is comprised of two or more compliant members 20, as shown in FIGS. 3 and 4. The number of compliant members 20 affects the stability and the damping performance of the shock absorber 10, and is determined by the desired results of these same parameters. The addition of each compliant member 20 adds to the stiffness and stability of the shock absorber as a whole 10.

Figure 5:
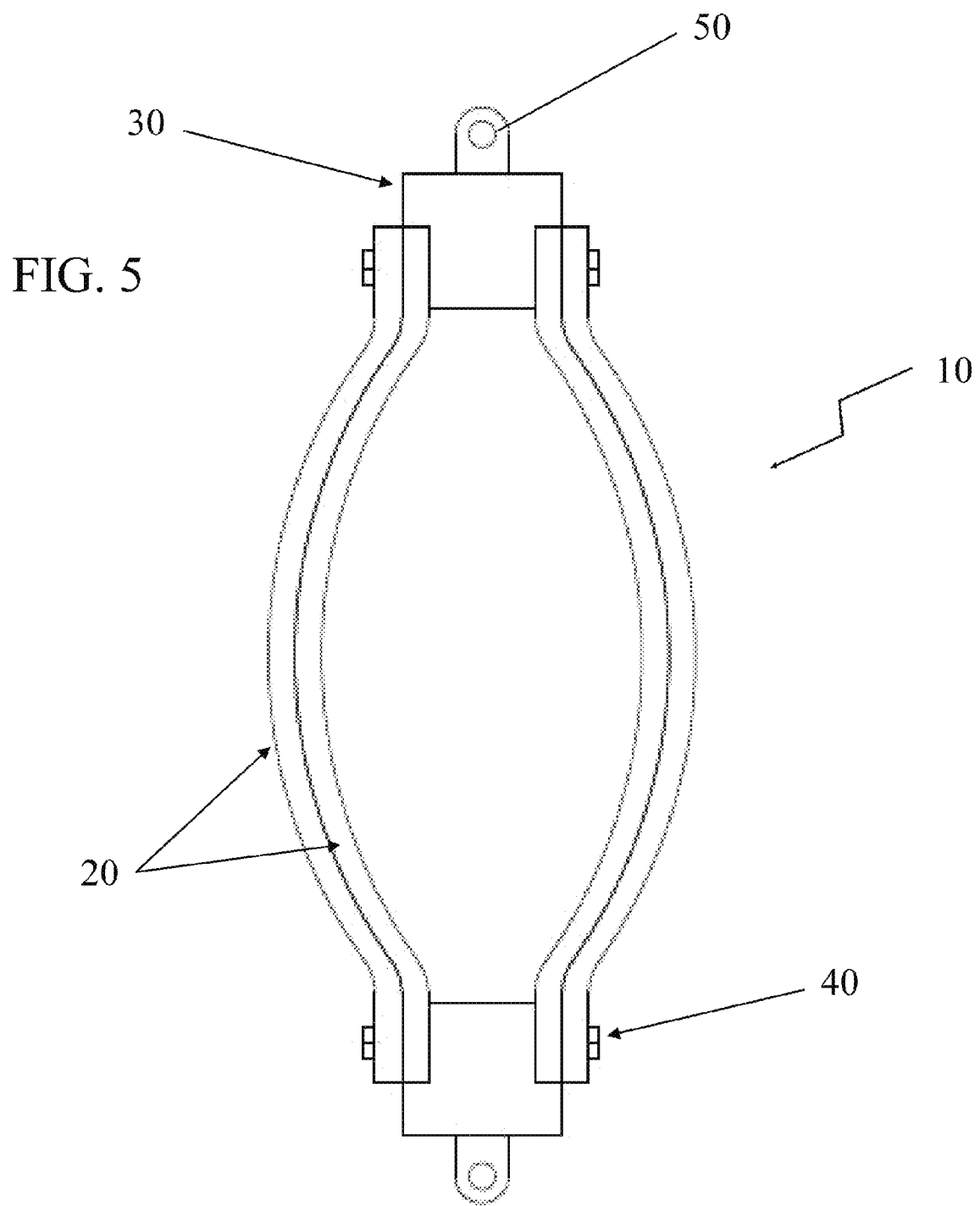
FIG. 5 illustrates a side plan view of a shock absorber of the present invention with additional compliant members.

Additional compliant members 20 may be attached over or next to existing compliant members using a mechanical fastening means 40 such as, but not limited to, screws, bolts, pressure fit, or compliant clip, as shown in FIG. 5 with an example having bolts keeping the compliant members 20 connected. Alternatively, additional compliant members 20 may be removed by disengaging the mechanical fastening means 40. The flexion and damping characteristics of the shock absorber 10 may be advantageously quickly adjusted by adding or removing compliant members 20 from the shock absorber 10, providing flexibility to the user in how much shock absorption he or she wishes the shock absorber to have at any given time.

Figure 6:
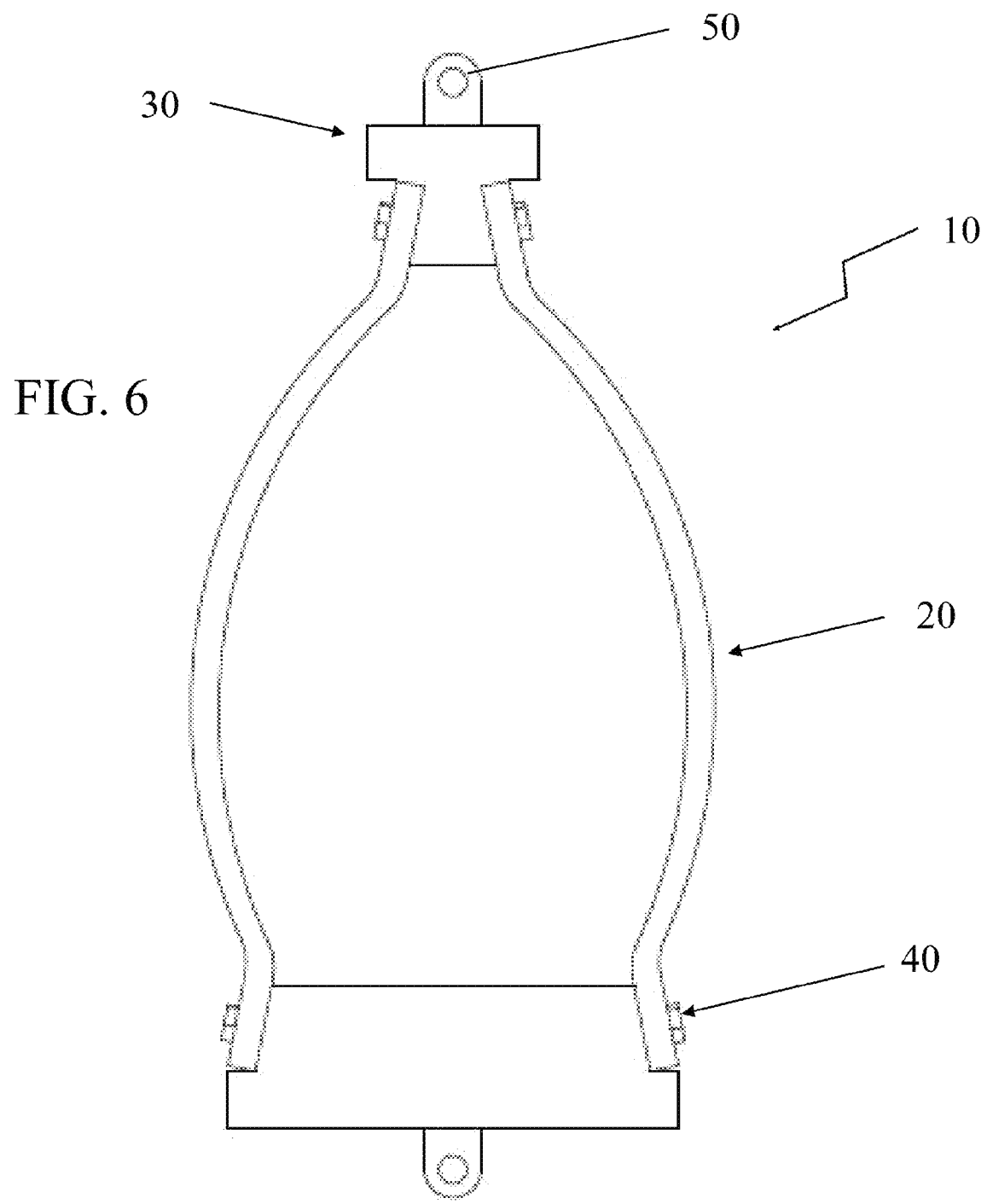
FIG. 6 illustrates a side plan view of a shock absorber of the present invention with the compliant members angled.

In some embodiments, the orientation of the compliant members 20 with respect to the mounting blocks 30, other compliant members 20 or another given reference point of the shock absorber varies. For example, if the direction of force loaded on the shock absorber 10 is considered to be vertical, the compliant members 20 may be oriented parallel to the vertical direction of force, such as the compliant members 20 of FIG. 1, or they may be oriented at an angle offset from the vertical direction of force, as shown in FIG. 6.

It may be helpful to describe the compliant members 20 in these figures as each having a straight longitudinal axis that runs through each end of the compliant members 20, such as at the points where they are mounted to the mounting blocks 40. Using these axes as references, in some embodiments multiple compliant members 20 have parallel longitudinal axes, as is the case in the embodiments shown in FIG. 1 or 3 since the distances between the mounting points of the compliant members are equal for each of the compliant members shown, and in other embodiments the compliant members 20 have non-parallel longitudinal axes, as is the case in the embodiment of FIG. 6 where the mounting point of the lower mounting block 40 has the compliant members 20 spaced farther apart than the top mounting block 30, so the longitudinal axes of the compliant members 20 in FIG. 6 would not trace parallel paths.

Figure 7:
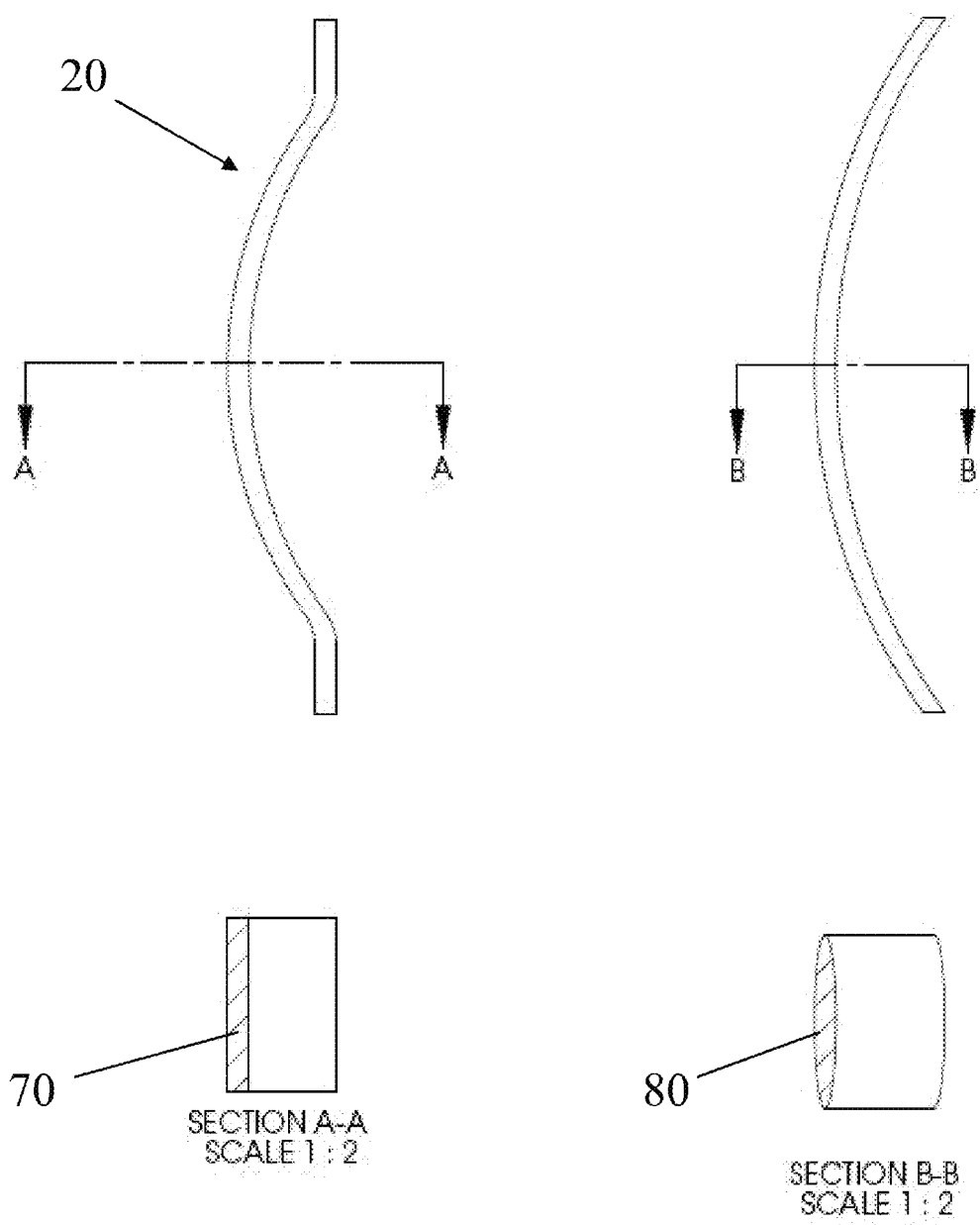
FIG. 7 illustrates a side plan view with section views of a compliant member of the present invention and a compliant member with an elliptical cross-section.
Figure 8:
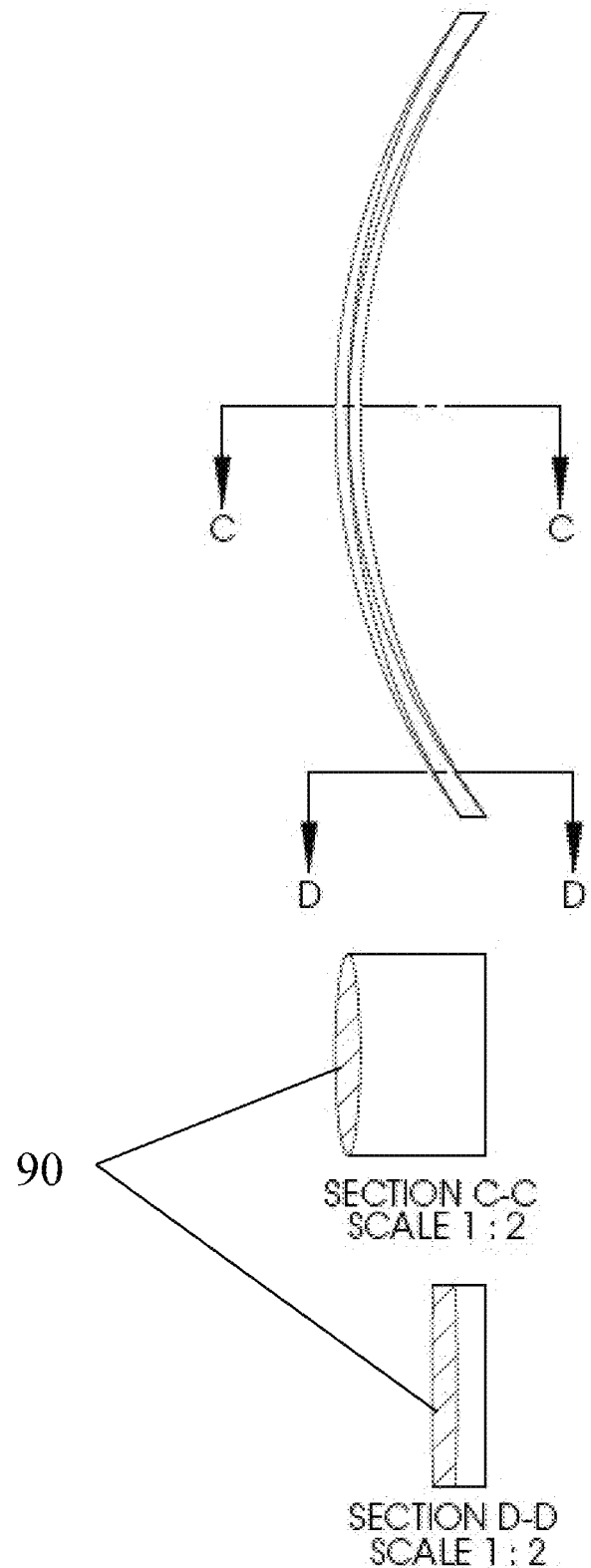
FIG. 8 illustrates a side plan view with section views of a compliant member of the present invention with varying cross-sections.

In some embodiments, the shape and dimensions of the compliant members 20 varies from that shown in FIGS. 1 through 6. A preferable shape of a compliant member 20 may be curved similar to a bow, with the thickness of the compliant member 20 being less than the length and width. This allows the compliant member 20 to flex in the direction of the curvature when compressed while resisting flexion in the lateral direction. A typical cross-sectional shape of a compliant member 20 is rectangular 70, as shown in FIG. 7. The compliant member 20 may take various geometries and cross-sectional shapes, including rectangular 70, elliptical 80, triangular, polygonal, and other shapes known in the art of compliant mechanism design. The cross-sectional shape can be constant or vary throughout the length of the compliant member 20, as shown in FIG. 8, depending on the desired flexural and damping characteristics of the compliant member 20. The length, width, thickness, and curvature of the compliant member 20 may vary depending on the desired flexural and damping characteristics of the shock absorber 10.

The direction of the curvature of compliant members 20 is shown as extending outward, but in other embodiments the direction of curvature may be oriented inward or in another direction. In the pictured embodiments each compliant member 20 has one curve, but in other embodiments it may be preferable to have more than one curve. By using a compliant member with multiple curves in an alternating pattern, the overall amount of displacement in the outward horizontal direction while maintaining vertical displacement is reduced.

Figure 9:
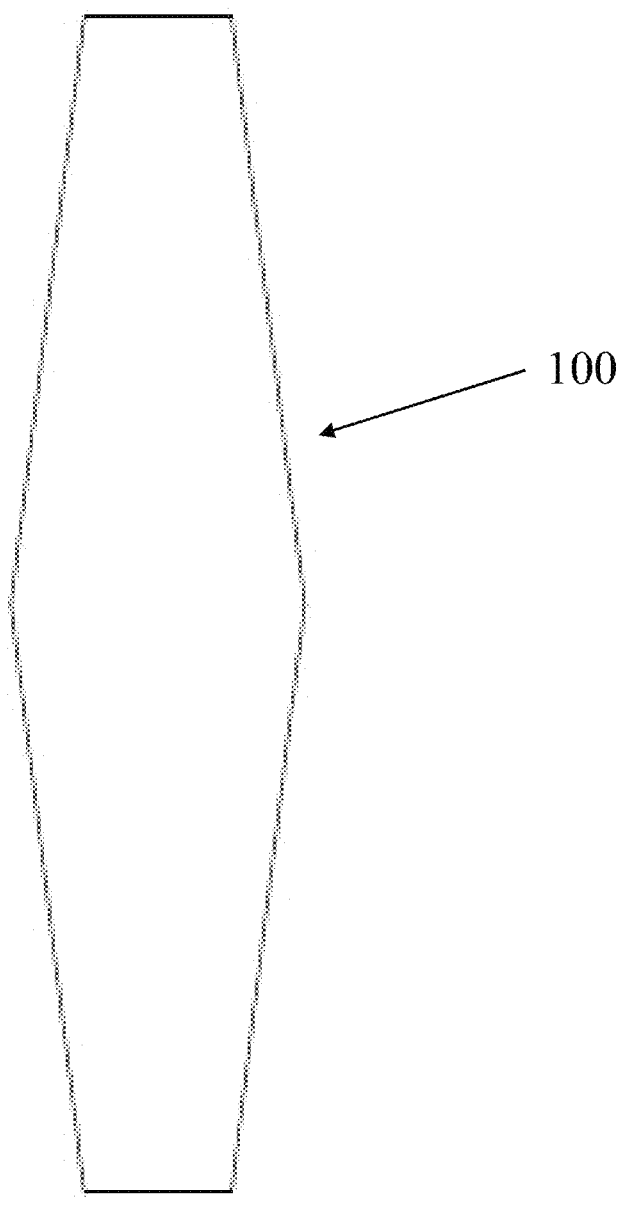
FIG. 9 illustrates a front plan view of a compliant member of the present invention that varies in width along the length.
Figure 10:
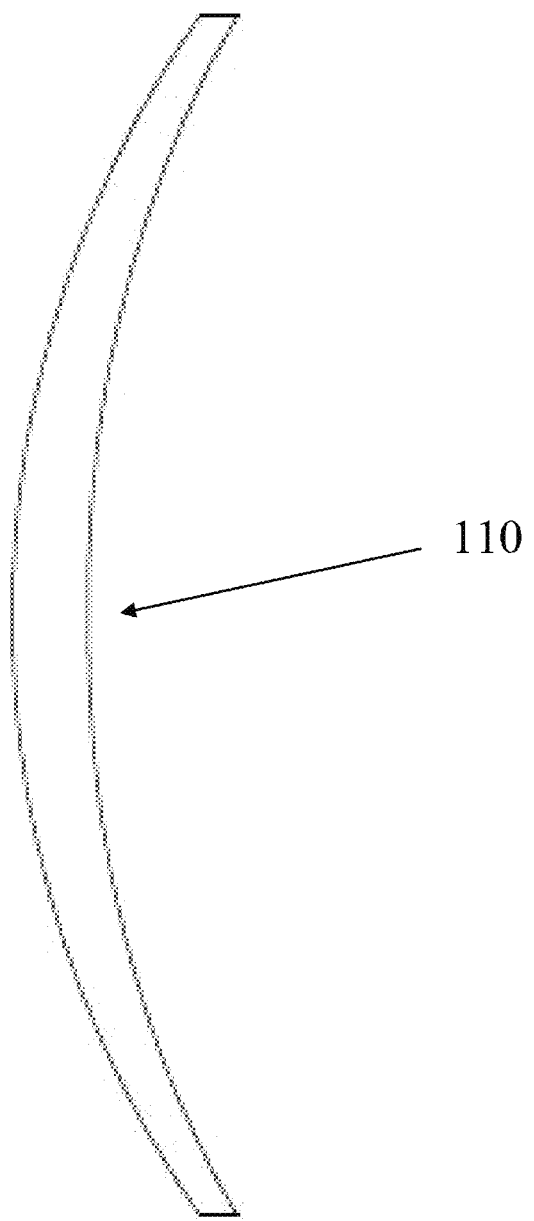
FIG. 10 illustrates a side plan view of a compliant member of the present invention that varies in thickness along the length.

The shape of a compliant member 20 can be modified in some embodiments so that the stresses experienced throughout the length of the member are constant. Since the highest stresses are seen at the middle of a compliant member 20 when under a load, the stresses across the member are equalized by making the middle section the thickest and gradually thinner towards the ends. Constant stress may be achieved by varying the width of a compliant member 100 along its length, as shown in FIG. 9. Constant stress may be achieved by varying the thickness of a compliant member 110 along its length, as shown in FIG. 10. This will reduce the amount of material used in a compliant member 20 while maintaining similar flexion and damping characteristics.

Figure 11:
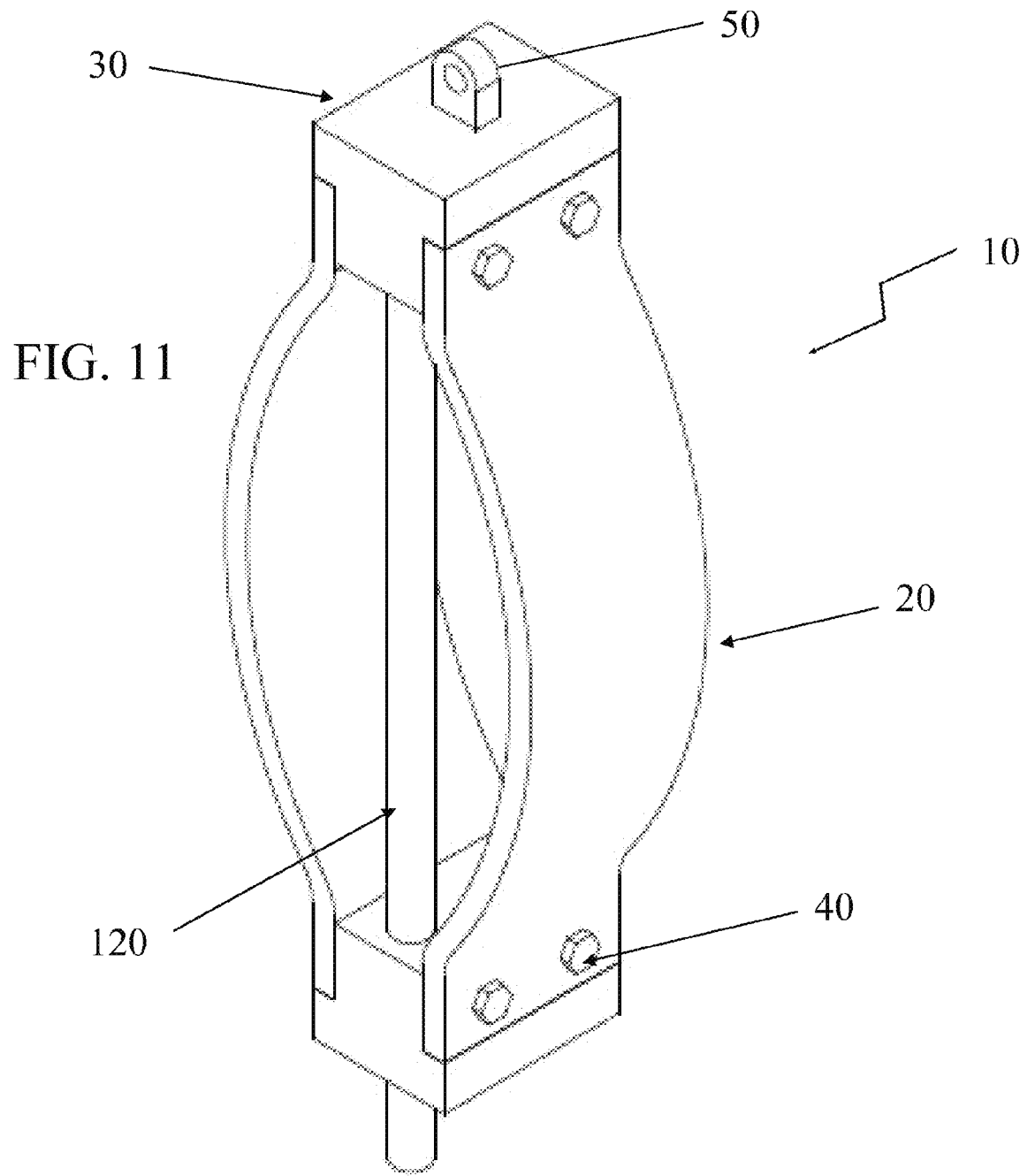
FIG. 11 illustrates a perspective view of a shock absorber of the present invention with a stabilization structure.
Figure 12:
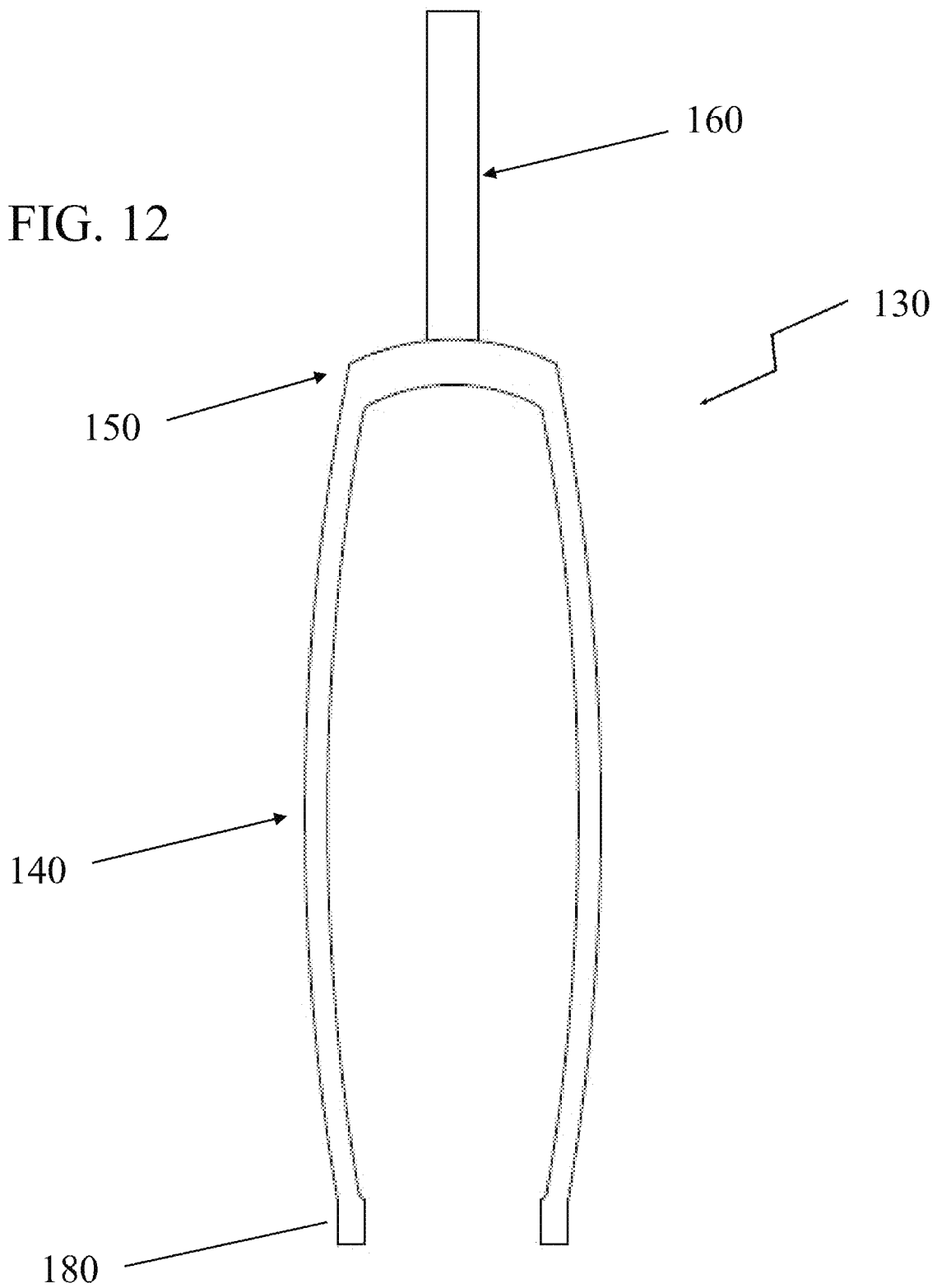
FIG. 12 illustrates a side plan view of a bicycle front fork shock absorber based on the present invention as one piece.
Figure 13:
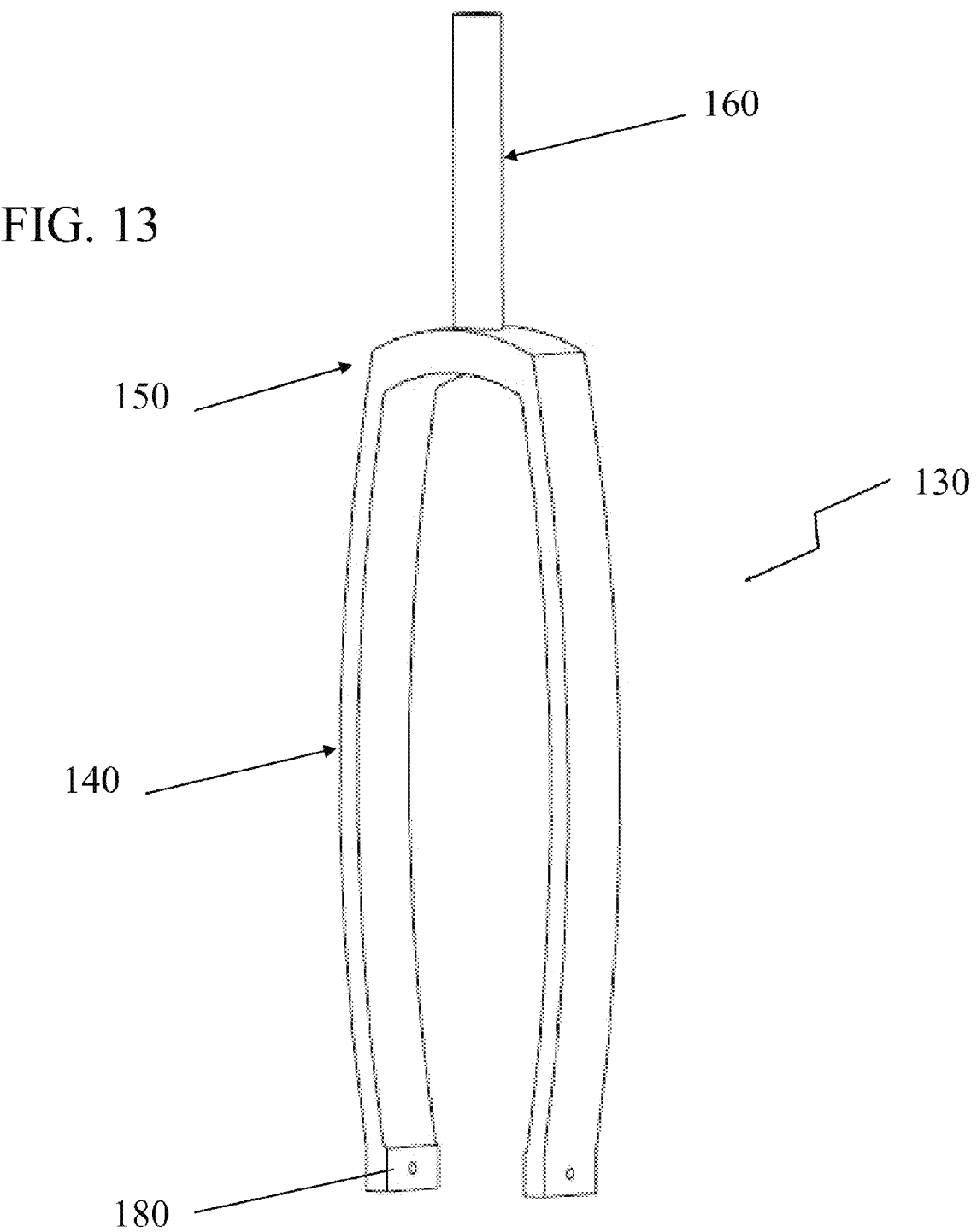
FIG. 13 illustrates a perspective view of a bicycle front fork shock absorber based on the present invention as one piece.

In some embodiments, a stabilization structure 120 is incorporated into the shock absorber 10 to control the direction of flexion, as shown in FIG. 11. The stabilization structure 120 can be, but is not limited to, tubular with an elliptical or polygonal cross-sectional shape. The stabilization structure 120 can be connected to one mounting block 30 and may slide past the mounting block on the other end of the compliant members 20 so that it does not restrict the flexion and damping of the shock absorber in the direction of sliding, but it does restrict motion in the plane perpendicular to the direction of sliding. The stabilization structure may also be comprised of a system of links with pivot points, sliding members, etc. The stabilization structure 120 is located between the compliant members, or may be located to one side of the compliant members or outside of the compliant members. The stabilization structure 120 may also pass through the middle of a compliant member. The number of stabilization structures 120 shown is one, but may be more. The stabilization structure 120 may be made of any material that is strong and rigid, and of materials including but not limited to steel, aluminum, titanium, carbon fiber, fiberglass, Delrin, polypropylene, and other metals, polymers and composites.

In some embodiments, the shock absorber functions as a bicycle front fork shock absorber 130, as shown in FIGS. 12 through 17. The dimensions, shape, material, orientation, and number of compliant members 140 of the bicycle front fork shock absorber 130 may vary per the embodiments described previously. The compliant members 140 in this embodiment are long enough to allow a standard bicycle wheel to fit within the bicycle front fork shock absorber 130 and to allow flexion without a mounting block 150 interfering with the bicycle wheel when a load is causes the compliant members to flex. The amount of clearance between the wheel and the mounting block may be determined by calculating the total amount of flexion of the shock absorber and adding in a margin of safety, for example, 0.5 to 1.5 inches. The distance between the compliant members 140 must be such to allow for a bicycle wheel to be mounted between them. The horizontal distance between the compliant members 140 must also be such to prevent interference with the spokes of a bicycle wheel, which would render the bicycle inoperable. This is especially important when the compliant members flex inwardly towards the wheel spokes.

The compliant members 140 connect to bicycle handlebars by being attached to a mounting block 150 and a steer tube 160. In embodiments where the compliant members 140 are not integrated with the mounting block 150 as a single piece, the compliant members 140 are attached to the mounting block 150 with screws, bolts, or another mechanical fastening means 170, such as in the embodiments shown in FIGS. 13 through 17. The compliant members 140 have a hole, slot, or other connection means 180 at their lower end through which a bicycle wheel skewer or axle passes to attach a bicycle wheel.

The shape, width, thickness, and material of the compliant member 140 may be varied to customize the flexion and resultant deflection of the bicycle front fork shock absorber 130 while it is in use. For example, a compliant member made of polypropylene (Young's modulus=217.6 kpsi), 18 inches in length, 2 inches in width, and with a radius of curvature of 50 inches could have a thickness of 0.5 inches. A compliant member with such dimensions would approximately have deflection properties of 0.1 inches of deflection with a 25 lbs load, 0.8 inches of deflection with a 75 lbs load, and 2.1 inches of deflection with 100 lbs load. The length of the compliant member in this example is determined by measuring the distance across the radius of a typical bicycle wheel, typical tire thickness, the amount of maximum deflection of the shock absorber 130, and a small amount of extra clearance for safety. The width in this embodiment is selected to be 2 inches as this makes for a reasonably dimensioned bicycle shock absorber member which balances weight, bulk, and stiffness. The radius of curvature is also selected to be 50 inches as this makes for a reasonably dimensioned shock absorber that does not interfere with normal bicycle operation. The thickness is determined by performing a method of pseudo numerical analysis for a large deflection cantilever beam of the initially curved pinned-pinned type at load points of 25 lbs, 75 lbs, and 100 lbs for varying thicknesses. The assumption is made that the desired deflection properties at these loads are less than 0.5 inches at 25 lbs, and 0.5-2 inches at 75 lbs. and 100 lbs. Upon completion of the pseudo numerical analysis, the thickness that best fits the desired deflection properties is selected. As a second example, following this same procedure a compliant member made of polyvinylchloride (Young's modulus=400 kpsi), 18 inches in length, 2 inches in width, and a radius of curvature of 50 inches could have a thickness of 0.4 inches. These calculations are given as an example for a select material and bicycle, but should not limit the dimensions and materials of a bicycle front fork shock absorber.

Figure 16:
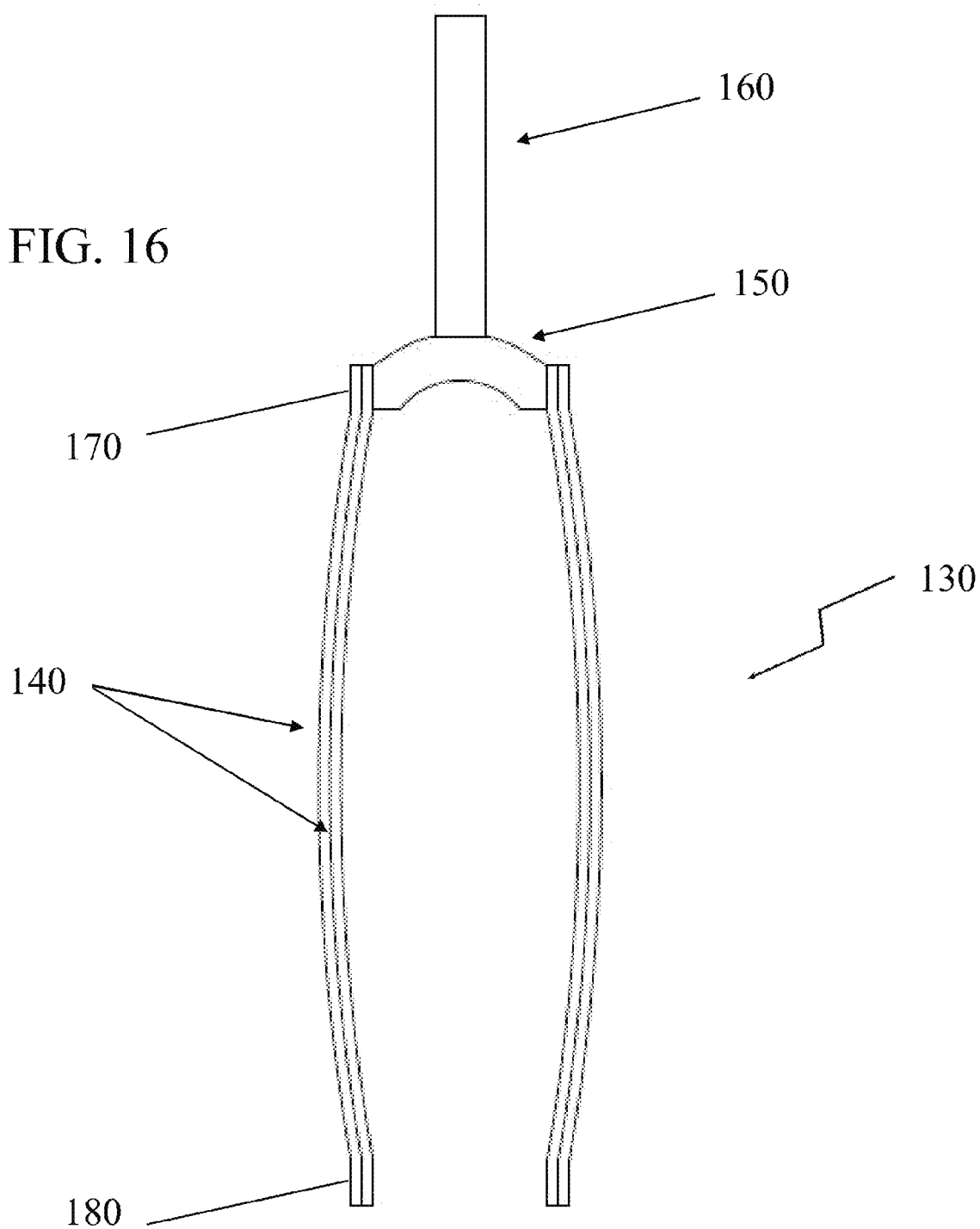
FIG. 16 illustrates a side plan view of a bicycle front fork shock absorber based on the present invention with additional compliant members.
Figure 17:
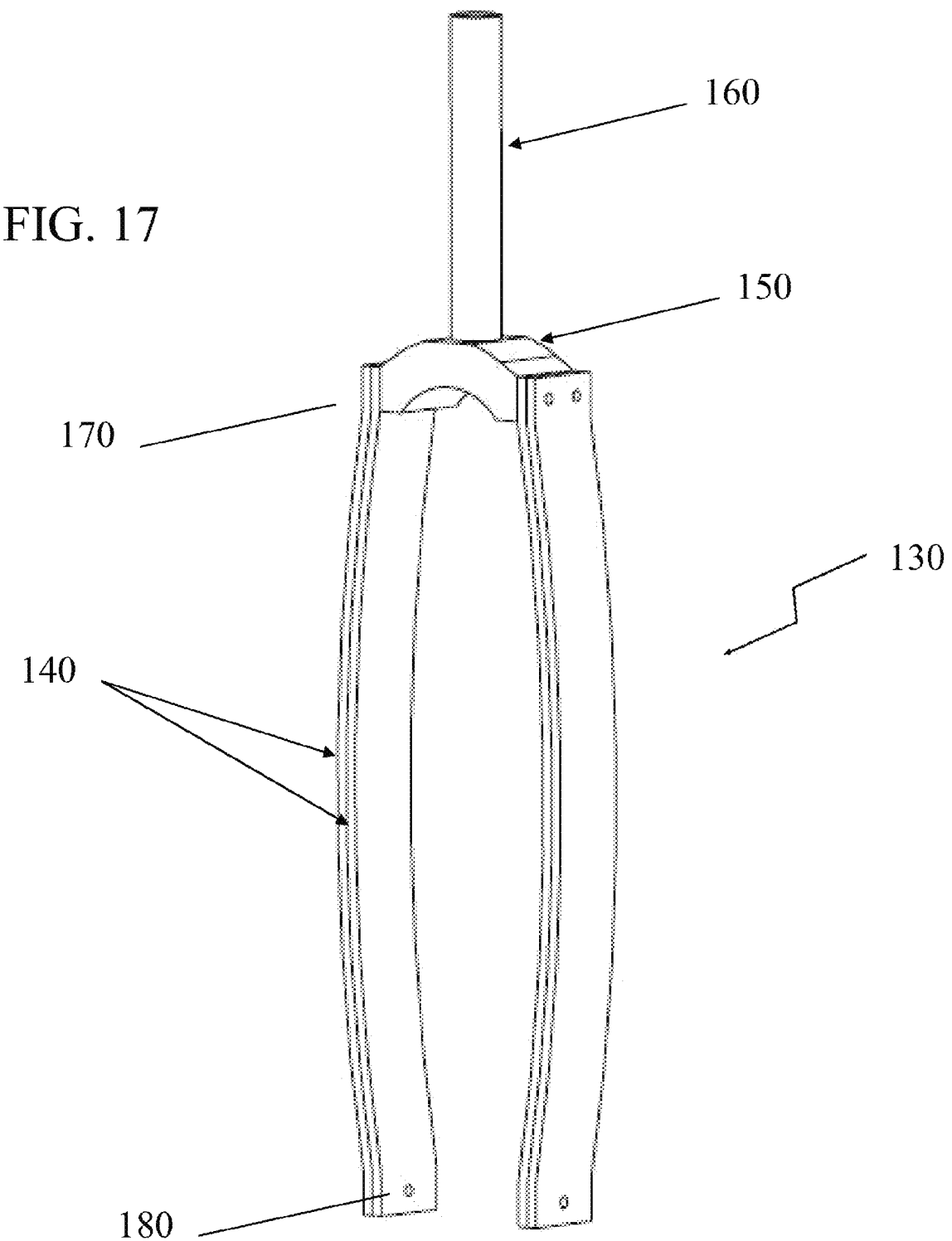
FIG. 17 illustrates a side plan view of a bicycle front fork shock absorber based on the present invention with additional compliant members.

In some embodiments the compliant members 140 may be added or removed from the inside or outside of the other compliant members 140 to quickly adjust the flexion and damping of the bicycle front fork shock absorber 130, as in FIGS. 16 and 17.

Figure 14:
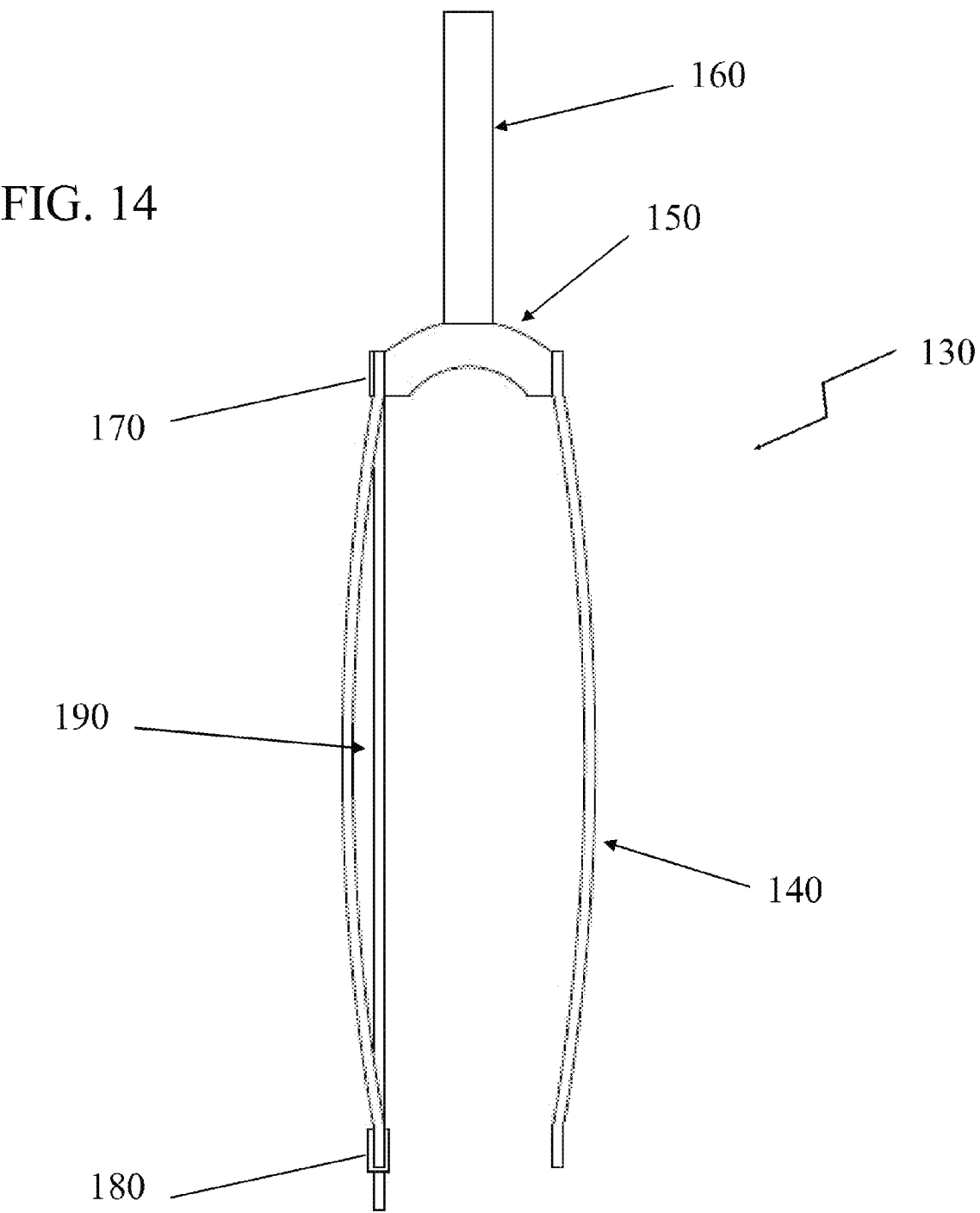
FIG. 14 illustrates a side plan view of a bicycle front fork shock absorber based on the present invention with a stabilization bar.
Figure 15:
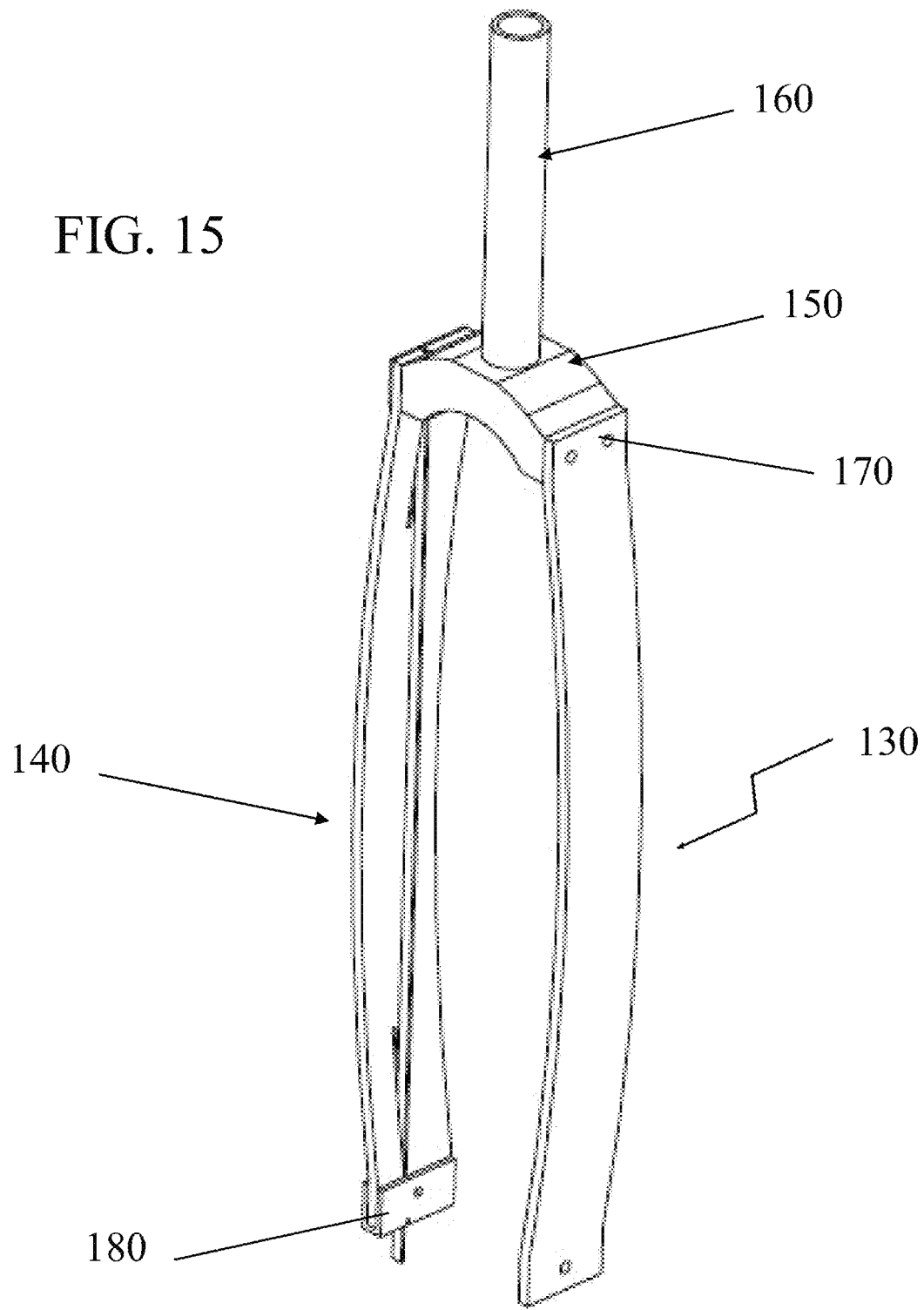
FIG. 15 illustrates a side plan view of a bicycle front fork shock absorber based on the present invention with a stabilization bar.

A stabilization bar 190 may be used to prevent the bicycle fork shape from side to side, forward, and backward sway, as shown in FIGS. 14 and 15. The stabilization bar 190 may be shaped and function similar to the stabilization structure described in previous embodiments. In some embodiments this means that the stabilization bar may slide at its connection point near the wheel attachment location 180 when a force is applied to the frame.

The benefits of a bicycle front fork shock absorber with compliant members are that it is lightweight, it is simple in design, it has few movable joints, it can be designed to have precise flexion and damping characteristics, and it is resilient in harsh conditions. By being light weight, it makes a bicycle less strenuous to ride. Being simple, the bicycle front fork shock absorber is user friendly. The reduced number of movable joints reduces wear. Due to the dirty and harsh conditions of bicycling, it is important for the bicycle front fork shock absorber to be resilient while under these conditions.

Figure 18:
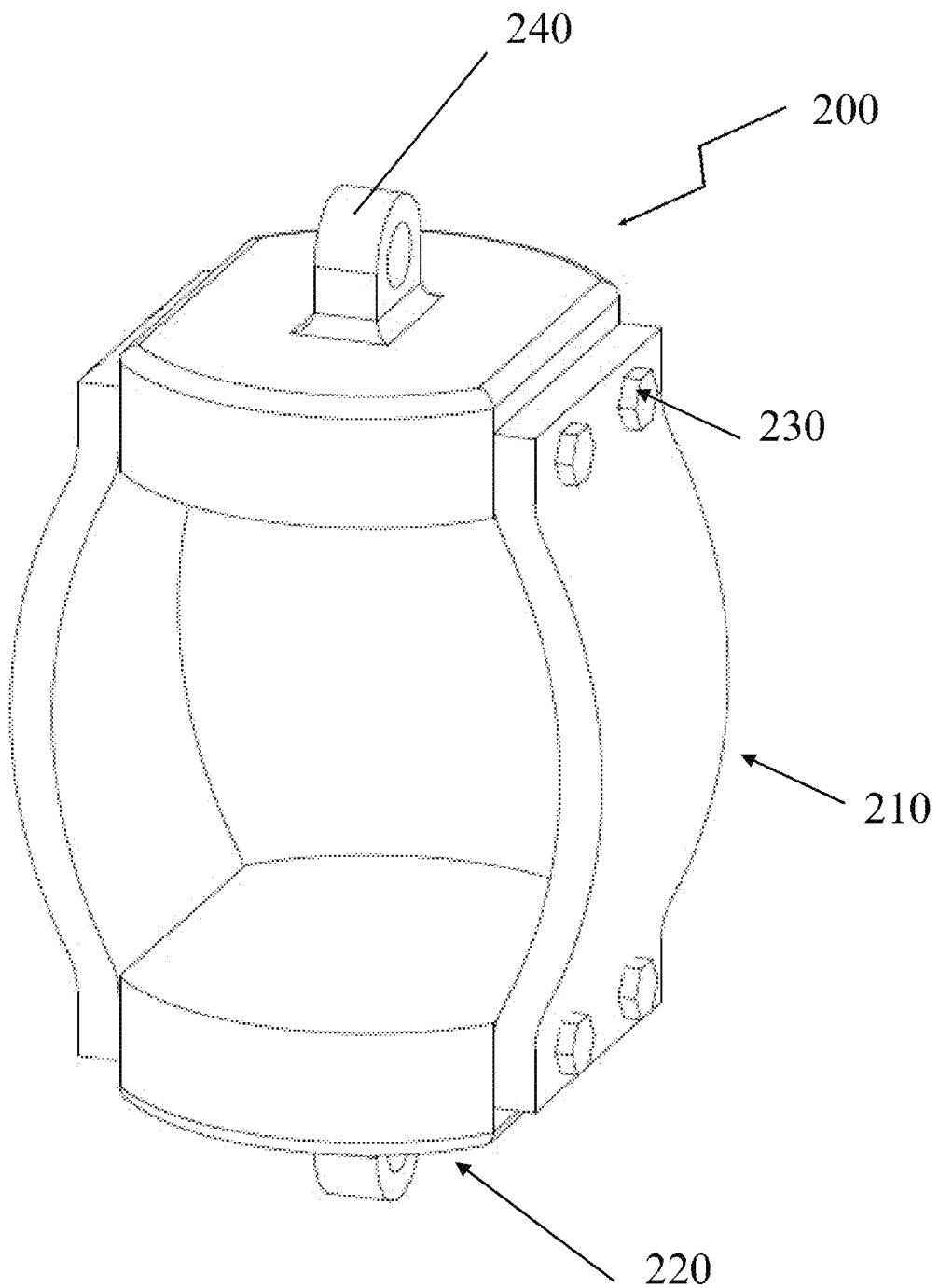
FIG. 18 illustrates a perspective view of a bicycle rear suspension shock absorber based on the present invention.

In some embodiments, a shock absorber is designed in such a way that it functions as a bicycle rear suspension shock absorber 200, as shown in FIG. 18. The bicycle rear suspension shock absorber 200 connects to a full-suspension bicycle in a manner similar to existing bicycle rear suspension shock absorbers. For example, one end bracket 240 may connect to the cross bar or seat tube of a bicycle, and the opposite end bracket 240 may connect to the chain stay or seat stay of a bicycle. The dimensions, shape, material, orientation, and number of compliant members 210 of the bicycle rear suspension shock absorber 200 may vary in like manner as the embodiments described previously. The length of the compliant members 210 is such to make the bicycle rear suspension shock absorber 200 similar in size to existing bicycle rear suspension shock absorbers so that it is compatible with existing full-suspension bicycle frames.

The compliant members 210 connect to the mounting block 220 with screws or bolts 230, and may also be attached through other methods described in the embodiments above. The bracket 240 is of appropriate size and shape to properly connect to a bicycle frame.

The shape, width, thickness, and material of the compliant member 210 may be varied to customize the flexion and deflection of the bicycle rear suspension shock absorber 200. Compliant members 210 may be added or removed to quickly adjust the flexion and deflection of the bicycle rear suspension shock absorber 200.

A stabilization bar may be used to limit motion to the axial direction. The stabilization bar may be shaped and function similar to the stabilization structure described in previous embodiments.

The benefits of a bicycle rear suspension shock absorber are similar to the benefits of a bicycle front fork shock absorber.

In some embodiments, a shock absorber 250 has only a single compliant member 260, as shown in FIG. 19. The dimensions, shape, material, and orientation of the one-sided shock absorber 250 may vary in any applicable ways that the embodiments described previously could allow. Here, the compliant member 260 is affixed to a mounting block 270 at both of its ends. In some embodiments it may be preferable to mount the compliant member 260 to the mounting block 270 with screws, bolts, or another mechanical fastening means 280. In these embodiments the compliant member 260 may be mounted by any method that provides a secure connection which keeps the compliant member 260 affixed to the mounting block 270, including but not limited to clamps, welds, adhesive, epoxy, or a rotating pin joint. In some embodiments it may be preferable to do away with a mechanical fastening means 280 to connect the compliant member 260 to a mounting block 270 at one or both ends by combining the compliant member 260 and the mounting block 270 into one solid piece with a mounting block similar to the shape shown in the figures formed at the end of the compliant member 260. In some embodiments the mounting block 270 may be connected to an external mechanical system as described in previous embodiments.

A stabilization structure 300 is incorporated into the shock absorber 250 to control the direction of flexion, as shown in FIG. 19. The stabilization structure 300 can be, but is not limited to, tubular with an elliptical or polygonal cross-sectional shape. The stabilization structure 300 can be connected to one mounting block 270 and may slide past the mounting block on the other end of the compliant member 260 so that it does not restrict the flexion and damping of the shock absorber in the direction of sliding, but it does restrict motion in the plane perpendicular to the direction of sliding. The stabilization structure may also be comprised of a system of links with pivot points, sliding members, etc. The stabilization structure 300 is located to one side of the compliant member or outside of the compliant member. The stabilization structure 300 may also pass through the middle of a compliant member. The number of stabilization structures 300 shown is one, but may be more. The stabilization structure 300 may be made of any material that is strong and rigid, and of materials including but not limited to steel, aluminum, titanium, carbon fiber, fiberglass, Delrin, polypropylene, and other metals, polymers and composites.

In some embodiments, the mounting block 270 is rectangular in shape with holes to which the compliant member 260 is affixed. The mounting block 270 is attached to an external dynamic mechanical system by connecting the bracket 290 to a compatible external connector. The mounting block 270 may take various geometries, dimensions, and shapes, including rectangular, circular, elliptical, triangular, polygonal, etc., depending on the design requirements of the system. The mounting block 270 may be made of any material that is strong and rigid, and of materials including but not limited to steel, aluminum, titanium, carbon fiber, fiberglass, Delrin, polypropylene, and other metals, polymers and composites.

In some embodiments, additional compliant members 260 may be attached over or next to the existing compliant member using a mechanical fastening means 280 such as, but not limited to, screws, bolts, pressure fit, or compliant clip, similar to previous embodiments. Alternatively, additional compliant members 260 may be removed by disengaging the mechanical fastening means 280. The flexion and damping characteristics of the shock absorber 250 may be advantageously quickly adjusted by adding or removing compliant members 260 from the shock absorber 250, providing flexibility to the user in how much shock absorption he or she wishes the shock absorber to have at any given time.

In some embodiments, the orientation of the compliant member 260 with respect to the mounting blocks 270 or another given reference point of the shock absorber 250 varies. For example, if the direction of force loaded on the shock absorber 250 is considered to be vertical, the compliant member 260 may be oriented parallel to the vertical direction of force, such as the compliant member 20 of FIG. 19, or they may be oriented at an angle offset from the vertical direction of force, similar to previous embodiments such as the embodiment depicted in FIG. 6.

In some embodiments, the shape and dimensions of the compliant member 260 varies from that shown in FIG. 19. A preferable shape of a compliant member 260 may be curved similar to a bow, with the thickness of the compliant member 260 being less than the length and width. This allows the compliant member 260 to flex in the direction of the curvature when compressed while resisting flexion in the lateral direction. A typical cross-sectional shape of a compliant member 260 is rectangular, as shown in previous embodiments. The compliant member 260 may take various geometries and cross-sectional shapes, including rectangular, elliptical, triangular, polygonal, and other shapes known in the art of compliant mechanism design. The cross-sectional shape can be constant or vary throughout the length of the compliant member 260, as shown in previous embodiments, depending on the desired flexural and damping characteristics of the compliant member 260. The length, width, thickness, and curvature of the compliant member 260 may vary depending on the desired flexural and damping characteristics of the shock absorber 250.

The direction of the curvature of the compliant member 260 is shown as extending outward, but in other embodiments the direction of curvature may be oriented inward or in another direction. In the pictured embodiment the compliant member 260 has one curve, but in other embodiments it may be preferable to have more than one curve. By using a compliant member with multiple curves in an alternating pattern, the overall amount of displacement in the outward horizontal direction while maintaining vertical displacement is reduced.

The shape of a compliant member 260 can be modified in some embodiments so that the stresses experienced throughout the length of the member are constant. Since the highest stresses are seen at the middle of a compliant member 260 when under a load, the stresses across the member are equalized by making the middle section the thickest and gradually thinner towards the ends. Constant stress may be achieved by varying the width of a compliant member along its length, as shown in previous embodiments. Constant stress may be achieved by varying the thickness of a compliant member along its length, as shown in previous embodiments. This will reduce the amount of material used in a compliant member 260 while maintaining similar flexion and damping characteristics.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module names other than those depicted herein can be applied to the various partitions.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to" or other like phrases in some instances shall not be read to mean that the narrower case is intended or required in instances where such broadening phrases may be absent.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A compliant shock absorber apparatus, comprising:
   a bow-shaped compliant member, said member having a first end, a second end, and a longitudinal axis passing through the first end and the second end, where said member is shaped to a predefined length and curvature based on a predetermined amount of flexion and damping for a dynamic mechanical system;
   a first mounting block, to which said first end of said member is mounted, and a second mounting block, to which said second end of said member is mounted, wherein said first mounting block and said second mounting block are shaped to connect to said dynamic mechanical system; and
   a stabilization structure having a lengthwise axis, said stabilization structure being mounted to said first mounting block and to said second mounting block, wherein said stabilization structure restricts flexion at said ends of said compliant member in a direction perpendicular to said lengthwise axis.

2. The compliant shock absorber apparatus of claim 1, further comprising at least one additional bow-shaped compliant member which is attachable to and detachable from said ends of said bow-shaped compliant member.

3. The compliant shock absorber apparatus of claim 1, wherein said members have a cross sectional shape that is constant throughout the compliant member.

4. The compliant shock absorber apparatus of claim 1, wherein said members have a cross sectional shape that varies at multiple points throughout the compliant member.

5. A compliant bicycle front fork shock absorber, comprising:
   two bow-shaped compliant members, said members each having an upper end and a lower end;
   wherein said lower ends are shaped to connect to an axle of a bicycle wheel;
   wherein said upper ends are linked together and shaped to connect to a handlebar shaft of a bicycle;
   wherein the length and flexion characteristics of said members are sufficient to prevent said bicycle wheel from interfering with the handlebar shaft at maximum deflection;
   wherein said members have damping characteristics suited for standard bicycle operation; and
   wherein the deflection of said members does not interfere with spokes of said wheel when said shock absorber is placed under a load.

6. The compliant bicycle front fork shock absorber of claim 5, further comprising at least one additional bow-shaped compliant member which is attachable to and detachable from said ends of said bow-shaped compliant members.

7. The compliant bicycle front fork shock absorber of claim 5, wherein said bow-shaped compliant members have a cross-section that remains constant.

8. The compliant bicycle front fork shock absorber of claim 5, wherein said members have a cross sectional shape that varies at multiple points throughout the compliant member.

9. The compliant bicycle front fork shock absorber of claim 5, wherein said bow-shaped compliant members have lengths with constant stresses throughout.

10. The compliant bicycle front fork shock absorber of claim 5, further comprising a stabilization structure mounted to an upper end and a lower end of one of said compliant members, said structure having a lengthwise axis, wherein said structure restricts flexion at said ends of said compliant members in a direction perpendicular to said lengthwise axis.

* * * * *